(12) United States Patent
Hansson et al.

(10) Patent No.: US 11,753,070 B2
(45) Date of Patent: Sep. 12, 2023

(54) PREDICTIVE AND REAL-TIME VEHICLE DISTURBANCE COMPENSATION METHODS AND SYSTEMS

(71) Applicant: Volvo Car Corporation, Gothenburg (SE)

(72) Inventors: Anders Hansson, Gothenburg (SE);
Andreas Carlsson, Gothenburg (SE);
Markus Löfgren, Gothenburg (SE);
Carl-Johan Häll, Gothenburg (SE);
Håkan Karlsson, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 111 days.

(21) Appl. No.: 16/822,129

(22) Filed: Mar. 18, 2020

(65) Prior Publication Data
US 2021/0291897 A1   Sep. 23, 2021

(51) Int. Cl.
*B62D 6/00* (2006.01)
*B62D 5/04* (2006.01)
(Continued)

(52) U.S. Cl.
CPC ........... *B62D 6/001* (2013.01); *B62D 5/0463* (2013.01); *B62D 15/025* (2013.01); *G08G 1/096725* (2013.01)

(58) Field of Classification Search
CPC .... B62D 6/001; B62D 5/0463; B62D 15/025; G08G 1/096725
See application file for complete search history.

(56) References Cited

U.S. PATENT DOCUMENTS 7,840,342 B1   11/2010   Breed
8,126,642 B2   2/2012   Trepagnier et al.
(Continued)

FOREIGN PATENT DOCUMENTS

DE   102010013178 A1   12/2010
DE   102017001288 A1 *  8/2017   ............ B60W 30/12
(Continued)

OTHER PUBLICATIONS

Machine translation for DE-102017001288-A1 (Year: 2017).*
(Continued)

*Primary Examiner* — Jeff A Burke
*Assistant Examiner* — Mohamad O El Sayah
(74) *Attorney, Agent, or Firm* — Clements Bernard Walker; Christopher L. Bernard (57) ABSTRACT

A method and system for compensating for vehicle disturbances during vehicle operation, including: an algorithm for obtaining predicted driving condition data from a database, wherein the database includes one or more of geospatial data and remote vehicle data; an algorithm for obtaining real-time vehicle state data from equipment communicatively connected to a vehicle; an algorithm for combining the predicted driving condition data and the real-time vehicle state data to formulate a desired steering torque request necessary to compensate for predicted and actual driving conditions experienced by the vehicle; and an algorithm for providing the desired steering torque request to a power steering assist system of the vehicle to compensate for the predicted and actual driving conditions experienced by the vehicle.

20 Claims, 4 Drawing Sheets

(51) Int. Cl.
*B62D 15/02* (2006.01)
*G08G 1/0967* (2006.01)

(56) References Cited

U.S. PATENT DOCUMENTS

| | | | |
|---|---|---|---|
| 9,940,834 B1 * | 4/2018 | Konrardy | G08G 1/165 |
| 10,144,419 B2 | 12/2018 | Viehmann | |
| 10,534,370 B2 * | 1/2020 | Cavalcanti | G08G 1/0141 |
| 2009/0048738 A1 * | 2/2009 | Iwazaki | B62D 15/025 |
| | | | 701/44 |
| 2015/0057891 A1 | 2/2015 | Mudalige et al. | |
| 2016/0328661 A1 * | 11/2016 | Reese | G06N 20/00 |
| 2017/0352276 A1 * | 12/2017 | Arndt | G08G 1/0141 |
| 2018/0265127 A1 | 9/2018 | Walsh et al. | |
| 2019/0051172 A1 * | 2/2019 | Stenneth | G08G 1/166 |
| 2019/0291742 A1 | 9/2019 | Leach et al. | |
| 2019/0318174 A1 * | 10/2019 | Miklos | B60W 40/072 |

FOREIGN PATENT DOCUMENTS

| | | | | |
|---|---|---|---|---|
| WO | WO-2018026603 A1 * | 2/2018 | | B60W 30/00 |
| WO | 2019046504 A1 | 3/2019 | | |

OTHER PUBLICATIONS

Jul. 29, 2021 European Search Report, issued on International Application No. 21/163,047.
Abstract.

\* cited by examiner

PREDICTIVE AND REAL-TIME VEHICLE DISTURBANCE COMPENSATION METHODS AND SYSTEMS

TECHNICAL FIELD

The present disclosure relates generally to the automotive field. More particularly, the present disclosure relates to predictive and real-time vehicle disturbance compensation methods and systems. These methods and systems can be implemented as part of an advanced driver-assistance system (ADAS) or autonomous driving (AD) system, for example.

BACKGROUND

Some conventional ADASs provide lane-keeping and/or object-avoidance functionalities and the like, whereby a forward-looking camera and/or perception sensor (i.e., radar or lidar) image is used to segment and track lane markings and/or an object ahead of a vehicle. This information is processed to generate a steering torque request that is input to the power steering assist or power steering system of the vehicle as a steering torque overlay. This steering torque overlay effectively controls or biases the power steering system of the vehicle, altering the direction of travel of the vehicle without intervention of the driver or in conjunction with the AD system of the vehicle. In a milder version of these functionalities, the information is processed to generate steering wheel haptic feedback to the driver. Thus, in the lane-keeping assist case, for example, the steering torque overlay can be used to center the vehicle in a travel lane without intervention of the driver, allowing the driver to then steer over this underlying input.

Known ADASs or AD systems, however, do not adequately or efficiently provide a steering torque overlay that essentially nullifies or zeros vehicle disturbances experienced by a driver (when driving), such as road banking, cross-winds, and the like. For example, if a road is significantly banked or a measurable cross-wind is encountered, the driver must provide continuous steering input to counteract the side-force and vehicle drift experienced, in addition to the normal turning actions that must be taken over these undercurrents. As a result, driver steering effort is increased.

Thus, what is still needed in the art is a semi-autonomous function that better mitigates such vehicle disturbances caused by road banking or other road conditions, cross-winds or other weather conditions, uneven vehicle loads, mechanical vehicle biases, and the like, using sources of information and vehicle data that have not previously been exploited.

SUMMARY

In one exemplary embodiment, the present disclosure provides a method for compensating for vehicle disturbances during vehicle operation, the method including: obtaining predicted driving condition data from a database, wherein the database includes one or more of geospatial data and remote vehicle data; obtaining real-time vehicle state data from equipment communicatively connected to a vehicle; combining the predicted driving condition data and the real-time vehicle state data to formulate a desired steering torque request necessary to compensate for predicted and actual driving conditions experienced by the vehicle; and providing the desired steering torque request to a power steering assist system of the vehicle to compensate for the predicted and actual driving conditions experienced by the vehicle. The method further includes weighting the predicted driving condition data and the real-time vehicle state data based on a confidence associated with each prior to combining the predicted driving condition data and the real-time vehicle state data. The geospatial data is stored locally in the vehicle or remotely in a server and includes current or historical geospatial road condition data obtained from any source, historical geospatial road condition data obtained by the vehicle, and/or current or predicted weather data. The remote vehicle data includes one or more of current or historical geospatial road condition data and weather data. The method further includes validating the predicted driving condition data using the real-time vehicle state data. The method still further includes communicating the real-time vehicle state data to a remote server for use by other vehicles as other predicted driving condition data.

In another exemplary embodiment, the present disclosure provides a non-transitory computer-readable medium stored in a memory and executed by a processor for compensating for vehicle disturbances during vehicle operation by executing the steps including: obtaining predicted driving condition data from a database, wherein the database includes one or more of geospatial data and remote vehicle data; obtaining real-time vehicle state data from equipment communicatively connected to a vehicle; combining the predicted driving condition data and the real-time vehicle state data to formulate a desired steering torque request necessary to compensate for predicted and actual driving conditions experienced by the vehicle; and providing the desired steering torque request to a power steering assist system of the vehicle to compensate for the predicted and actual driving conditions experienced by the vehicle. The steps further include weighting the predicted driving condition data and the real-time vehicle state data based on a confidence associated with each prior to combining the predicted driving condition data and the real-time vehicle state data. The geospatial data is stored locally in the vehicle or remotely in a server and includes current or historical geospatial road condition data obtained from any source, historical geospatial road condition data obtained by the vehicle, and/or current or predicted weather data. The remote vehicle data includes one or more of current or historical geospatial road condition data and weather data. The steps further include validating the predicted driving condition data using the real-time vehicle state data. The steps still further include communicating the real-time vehicle state data to a remote server for use by other vehicles as other predicted driving condition data.

In a further exemplary embodiment, the present disclosure provides a system for compensating for vehicle disturbances during vehicle operation, the system including: a predicted driving condition processing module operable for obtaining predicted driving condition data from a database, wherein the database includes one or more of geospatial data and remote vehicle data; a real-time vehicle state processing module operable for obtaining real-time vehicle state data from equipment communicatively connected to a vehicle; a steering torque generator processing module operable for combining the predicted driving condition data and the real-time vehicle state data to formulate a desired steering torque request necessary to compensate for predicted and actual driving conditions experienced by the vehicle; and a power steering assist system operable for receiving the desired steering torque request and generating a steering torque overlay to compensate for the predicted and actual driving conditions experienced by the vehicle. The steering torque generator processing module is further operable for weighting the predicted driving condition data and the real-time vehicle state data based on a confidence associated with each prior to combining the predicted driving condition data and the real-time vehicle state data. The system further includes a communications link operable for communicating the real-time vehicle state data to a remote server for use by other vehicles as other predicted driving condition data. Optionally, the predicted driving condition processing module is configured to execute an artificial intelligence algorithm operable for determining, at least in part, the predicted driving condition data.

BRIEF DESCRIPTION OF THE DRAWINGS

The present disclosure is illustrated and described herein with reference to the various drawings, in which like reference numbers are used to denote like method steps/system components, as appropriate, and in which.

DESCRIPTION OF EMBODIMENTS

The present disclosure provides an ADAS or AD system that overlays a torque request on the nominal electrical-assisted power steering torque, resulting in a semi-autonomous function that mitigates vehicle disturbances for a driver, such as those caused by road banking or other road conditions, cross-winds or other weather conditions, uneven vehicle loads, mechanical vehicle biases, and the like. These vehicle disturbances are mitigated using both predictive and real-time vehicle data from a geospatial database, forward vehicle sensing equipment, such as a camera or perception sensor, and vehicle inertial measurement units (IMUs). By applying data obtained from road models, weather forecasts, and vehicle state systems, both expected and experienced vehicle disturbances can be processed to generate a steering torque overlay that is fed to the power steering system of a vehicle, reducing driver steering and driving effort. Essentially, the vehicle can be made to automatically accommodate both expected and experienced vehicle disturbances without driver intervention.

For example, a steeply banked road or substantial cross-wind will cause the vehicle to drift without driver steering input. The driver must exert effort to counteract this drift. The driver steering effort may be reduced by predicting and sensing this banking or cross-wind and automatically applying an appropriate counter-torque to the power steering system. If the banking or cross-wind in present in conjunction with a geospatially-determined turn, for example, the predictive algorithm can reduce the overlayed steering torque entering the curve so as to not interfere with or alter the driver's normal steering input.

The present disclosure fuses in-vehicle data from perception sensors (i.e., cameras, radar, and lidar) and IMUs and geospatial data/predictive road models obtained from the cloud and/or other vehicles via the vehicle's communication link(s) to generate a highly-accurate local road model. This local road model is then used by the vehicle to generate a steering torque overlay that is input to the power steering system of the vehicle to mitigate vehicle disturbances, such as those caused by road banking or other road conditions, cross-winds or other weather conditions, uneven vehicle loads, mechanical vehicle biases, and the like. The result is an improved driver experience.

Figure 1:
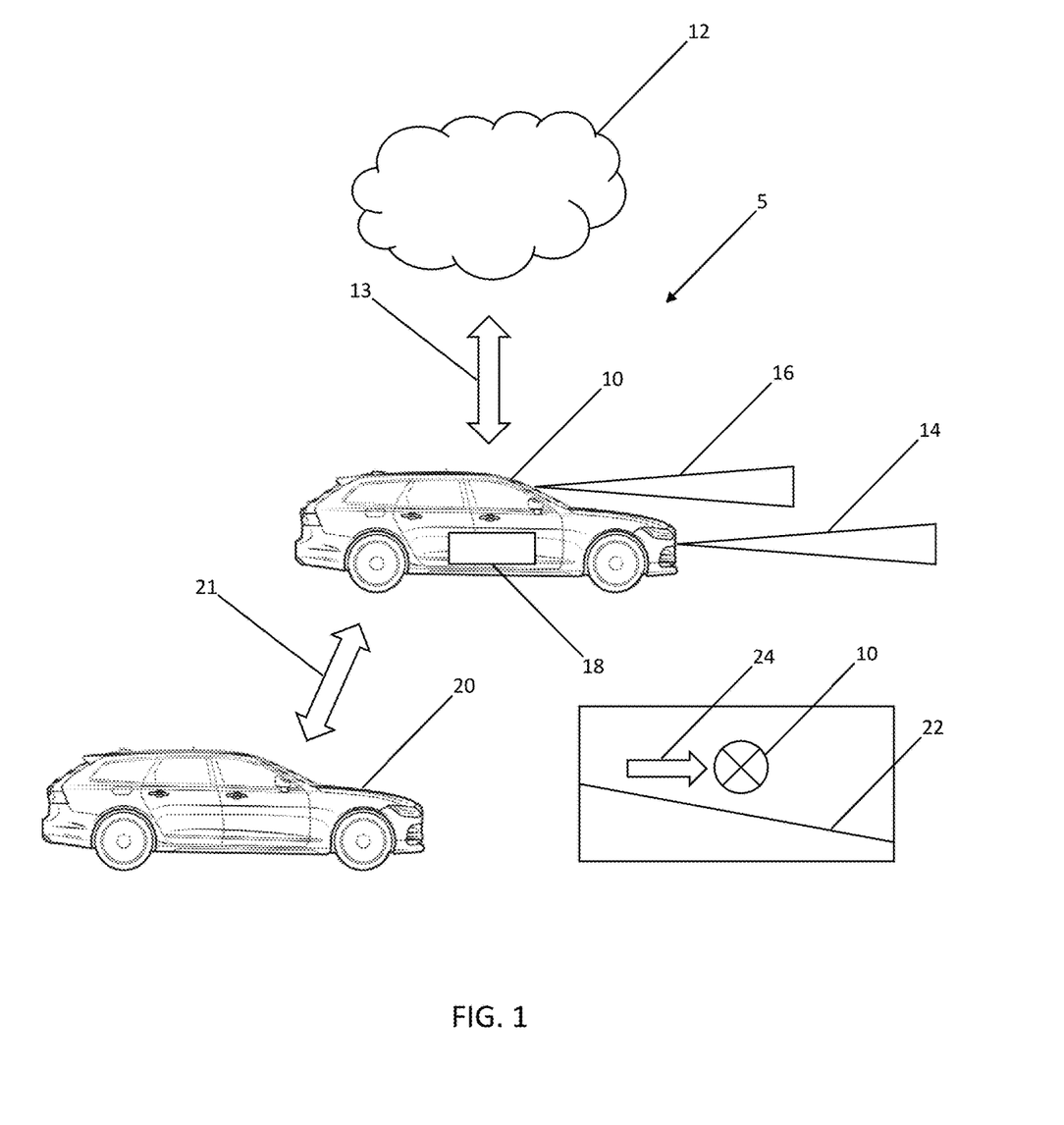
FIG. 1 is a schematic diagram illustrating one exemplary embodiment of the predictive and real-time vehicle disturbance compensation system of the present disclosure.

Referring now specifically to FIG. 1, in one exemplary embodiment of the system 5 of the present disclosure, the vehicle 10 obtains predictive (and current) driving (i.e., road and weather) condition data from a database 12 resident in the cloud via a vehicle communications link 13 on a vehicle-to-infrastructure (V2I) basis. This database 12 may include, for example, road direction, orientation, and topography information, weather (e.g., wind) forecasts and conditions, and any other road/weather-type data that could cause a vehicle disturbance and create an underlying steering torque that it is desirable to counteract. The vehicle 10 also obtains predictive (and current) driving (i.e., road and weather) condition data from one or more on-board cameras 14 and/or perception (i.e., radar or lidar) sensors 16. This data may again include, for example, road direction, orientation, and topography information, weather (e.g., wind) conditions, and any other road/weather-type data that could cause a vehicle disturbance and create an underlying steering torque that it is desirable to counteract. The vehicle 10 further obtains current driving (i.e., road and weather) condition data from one or more on-board IMUs 18, in the form of vehicle attitude, speed, and force data. This data may again include, for example, road orientation and topography information, weather (e.g., wind) conditions, and any other road/weather-type data that represents a current a vehicle disturbance and create an underlying steering torque that it is desirable to counteract. The vehicle 10 still further obtains predictive (and current) driving (i.e., road and weather) condition data from one or more other vehicles 20 via a vehicle communications link 21 on a vehicle-to-vehicle (V2V) basis. This data may again include, for example, road direction, orientation, and topography information, weather (e.g., wind) conditions, and any other road/weather-type data that could cause a vehicle disturbance and create an underlying steering torque that it is desirable to counteract. Advantageously, the real-time data collected can be used to validate the predictive data collected, as the two should be geospatially consistent. All data collected can be stored and used in the future as historical geospatial data or shared with other vehicles 20 as predictive geospatial data.

Thus, the vehicle 10 is constantly aware of the road condition (e.g., banking 22), cross-wind 24 conditions, and the like that it is currently experiencing and about to experience. Essentially, any real-time or predictive conditions that could cause vehicle drift or an undesirable steering torque that should be compensated for are known. The vehicle 10 is aware of its current road, weather, loading, and mechanical conditions, as well as those it is soon to encounter, within a reasonable degree of certainty. This can be used by the vehicle 10 to generate a corresponding steering torque overlay to counteract any present or expected drift, thereby reducing driver steering effort.

Figure 2:
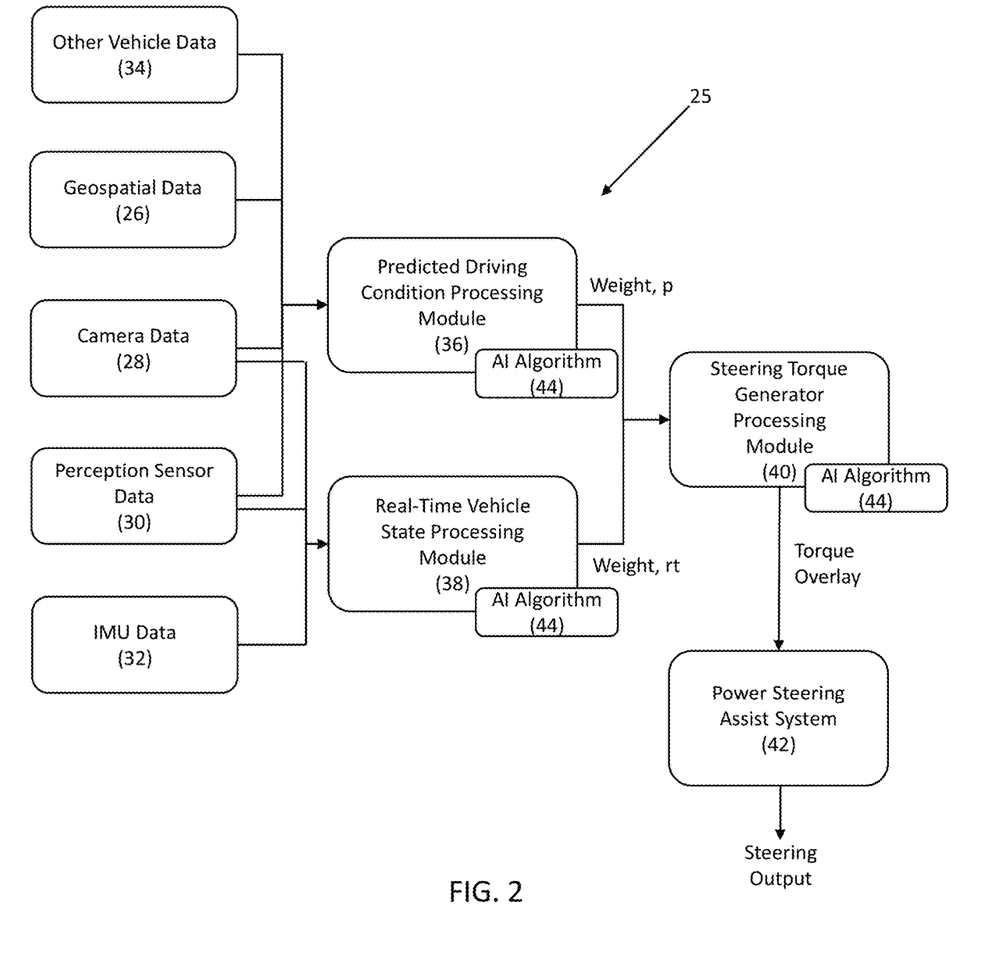
FIG. 2 is a schematic diagram illustrating one exemplary embodiment of the predictive and real-time vehicle disturbance compensation method flow of the present disclosure.

Referring now specifically to FIG. 2, in one exemplary embodiment of the method flow 25 of the present disclosure, a predicted driving condition processing module 36 associated with the vehicle 10 (FIG. 1) obtains predicted driving condition data from the database 12 (FIG. 1), which includes geospatial data that may be historical data or predictive data, as well as such data from the remote vehicle 20 (FIG. 1), and specifically geospatial data 26, camera data 28, perception sensor (i.e., radar and lidar) data 30, and other vehicle data 34. A real-time vehicle state processing module 38 associated with the vehicle 10 obtains real-time vehicle state data from one or more of a camera 14 (FIG. 1), a perception sensor (e.g., radar or lidar) 16 (FIG. 1), and an IMU 18 (FIG. 1) of the vehicle 10, and specifically camera data 28, perception sensor (i.e., radar and lidar) data 30, and IMU data 32. A steering torque generator processing module 40 is operable for combining the predicted driving condition data and the real-time vehicle state data to formulate a desired steering torque request necessary to compensate for the predicted and actual driving conditions experienced by the vehicle 10. As illustrated, a weight, p, may be applied to the predictive data and a weight, rt, may be applied to the real-time data representative of the desired contribution of or relative confidence in each. Here, again, the real-time data may be used to validate the predictive data. A power steering assist system 42 is operable for receiving the desired steering torque request and generating a steering torque overlay to compensate for the predicted and actual driving conditions experienced by the vehicle 10. The vehicle communications link 13 (FIG. 1) is operable for communicating the real-time vehicle state data to a remote server for use by the other vehicles 20 as other predicted driving condition data. Optionally, the predicted driving condition processing module 36 and the real-time vehicle state processing module 38 are optionally configured to execute an artificial intelligence algorithm 44, such as a deep learning (DL)/machine learning (ML) or neural network (NN) algorithm, operable for determining, at least in part, the predicted driving condition data and real-time driving condition data, as is the steering torque generator processing module 40. Again, all data collected can be stored and used in the future as historical geospatial data or shared with other vehicles 20 as predictive geospatial data.

Figure 3:
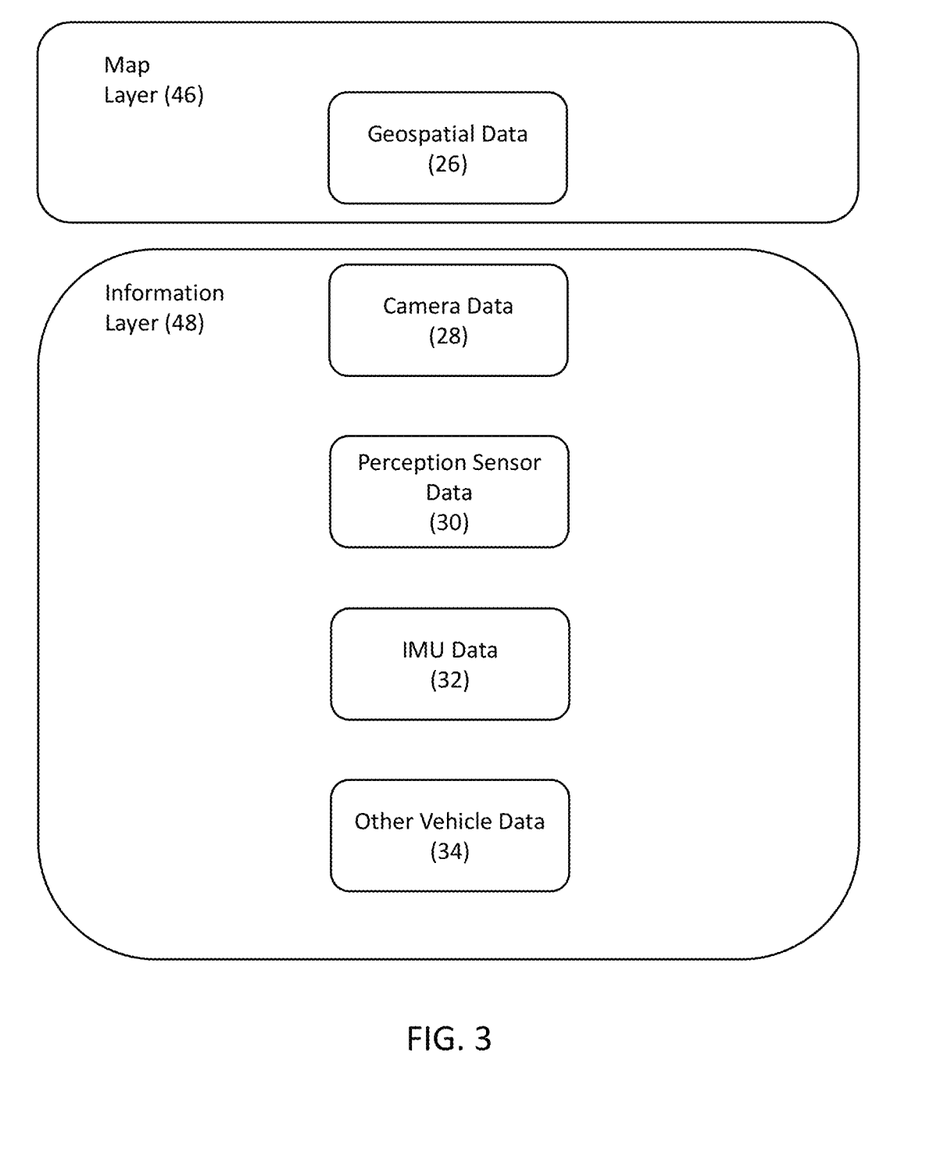
FIG. 3 is a schematic diagram illustrating the map layer and the information layer utilized by the predictive and real-time vehicle disturbance compensation system and method flow of the present disclosure.

FIG. 3 is a schematic diagram illustrating the map layer 46 and the information layer 48 utilized by the predictive and real-time vehicle disturbance compensation system 5 and method flow 25 of the present disclosure. The map layer 46 utilized by the vehicle processor includes the geospatial data 26, which consists of map data, weather forecasts by location, etc. The information layer 48 utilized by the vehicle processor includes the camera data 28, the perception sensor (i.e., radar and lidar) data 30, the IMU data 32, and the other vehicle data 34. It should be noted that all data associated with the present disclosure may be tagged by global positioning system (GPS) location data or the like to put it into proper environmental context with respect to the vehicle 10 (FIG. 1). Predictive data may also be current or historical, regardless of its type. For example, the vehicle 10 can obtain predictive road condition information from a map data database 12 (FIG. 1), and/or it may use its own camera(s) 14 (FIG. 1) and/or perception sensors 16 (FIG. 1), and/or it may obtain it from another vehicle 20, and/or it may obtain it from its own historical database(s) based on prior travel observations, whether they be camera-based, perception sensor-based, IMU-based, etc. The historical database(s) may be stored locally or remotely.

Figure 4:
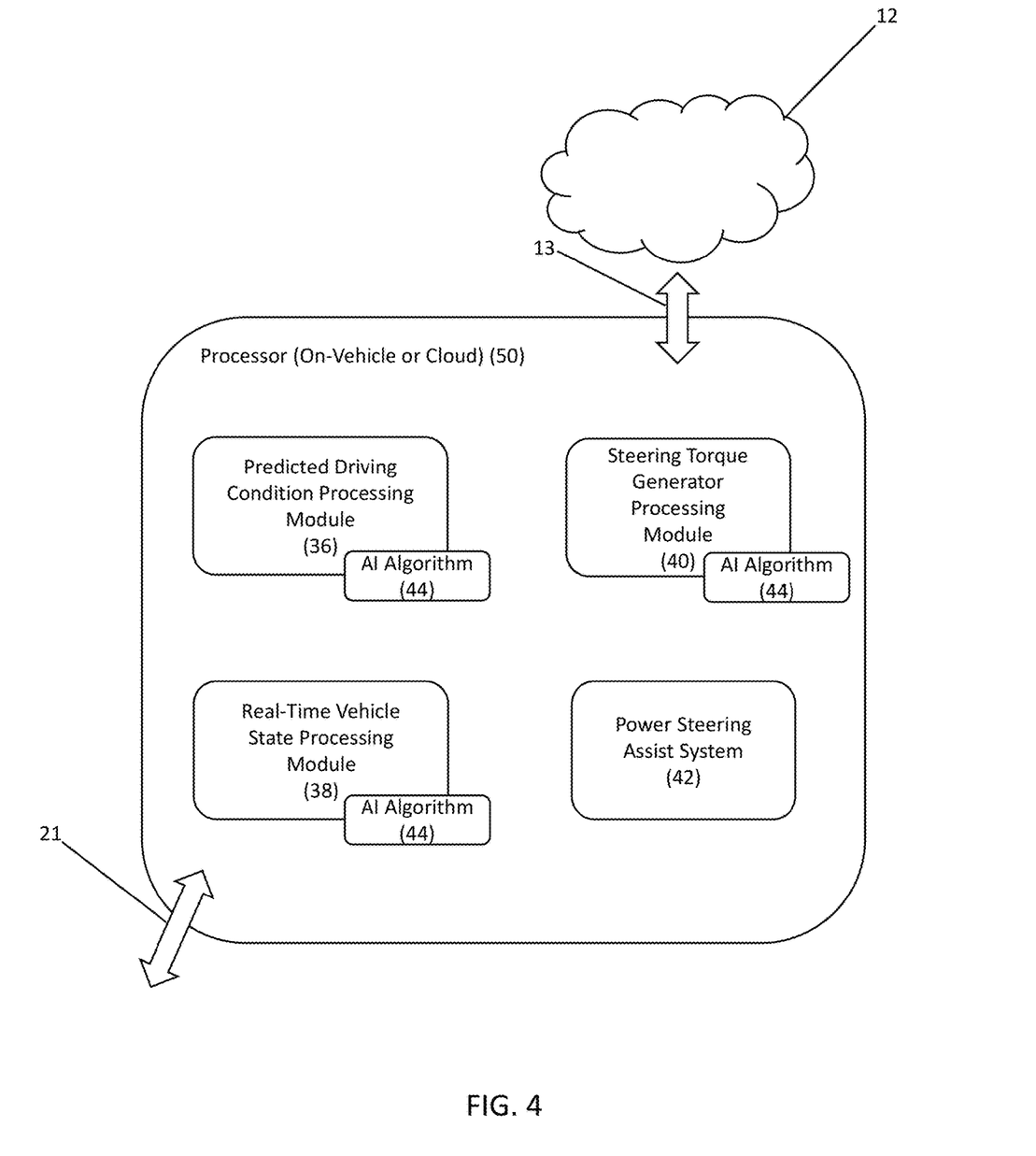
FIG. 4 is a schematic diagram illustrating one exemplary embodiment of the predictive and real-time vehicle disturbance compensation processing system of the present disclosure.

FIG. 4 is a schematic diagram illustrating one exemplary embodiment of the predictive and real-time vehicle disturbance compensation processing system 50 of the present disclosure. Here, the processor 50, which may be resident in or disposed remotely from the vehicle 10 (FIG. 1), embodies the predicted driving condition processing module 36 that obtains predicted driving condition data from one or more of the database 12, including the historical data and/or the predictive database, and the remote vehicle 20 (FIG. 1) via the vehicle communications link 21. The processor 50 also embodies the real-time vehicle state processing module 38 that obtains real-time vehicle state data from one or more of the camera 14 (FIG. 1), the perception sensor (e.g., radar or lidar) 16 (FIG. 1), and the IMU 18 (FIG. 1) of the vehicle 10. The processor 50 further embodies the steering torque generator processing module 40 that combines the predicted driving condition data and the real-time vehicle state data to formulate the desired steering torque request necessary to compensate for the predicted and actual driving conditions experienced by the vehicle 10. The processor 50 still further embodies the power steering assist system 42 that receives the desired steering torque request and generates the steering torque overlay to compensate for the predicted and actual driving conditions experienced by the vehicle 10. Again, the vehicle communications link 13 is operable for communicating the real-time vehicle state data to a remote server for use by the other vehicles 20 as other predicted driving condition data. All artificial intelligence algorithms 44 utilized are executed by the processor 50 in conjunction with their associated modules and/or algorithms. Again, all data collected can be stored in a memory and used in the future as historical geospatial data or shared with other vehicles 20 as predictive geospatial data.

It is to be recognized that, depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored or transmitted as one or more instructions or code on a computer-readable medium and executed by a hardware-based processing unit. Computer-readable media may include computer-readable storage media, which corresponds to a tangible medium, such as data storage media, or communication media, including any medium that facilitates transfer of a computer program from one place to another, e.g., according to a communication protocol. In this manner, computer-readable media generally may correspond to (1) a tangible computer-readable storage medium that is non-transitory or (2) a communication medium, such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can include random-access memory (RAM), read-only memory (ROM), electrically erasable-programmable read-only memory (EEPROM), compact disc read-only memory (CD-ROM) or other optical disc storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared (IR), radio frequency (RF), and microwave, then the coaxial cable, fiber optic cable, twisted pair, DSL, or wireless technologies, such as IR, RF, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), complex programmable logic devices (CPLDs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Thus, the present disclosure provides an ADAS or AD system that overlays a torque request on the nominal electrical-assisted power steering torque, resulting in a semi-autonomous function that mitigates vehicle disturbances for a driver, such as those caused by road banking or other road conditions, cross-winds or other weather conditions, uneven vehicle loads, mechanical vehicle biases, and the like. These vehicle disturbances are mitigated using both predictive and real-time vehicle data from a geospatial database, forward vehicle sensing equipment, such as a camera or perception sensor, and vehicle IMUS. By applying data obtained from road models, weather forecasts, and vehicle state systems, both expected and experienced vehicle disturbances can be processed to generate a steering torque overlay that is fed to the power steering system of a vehicle, reducing driver steering and driving effort. Essentially, the vehicle can be made to automatically accommodate both expected and experienced vehicle disturbances without driver intervention, improving steering feel and driver response to required steering maneuvers.

For example, a steeply banked road or substantial cross-wind will cause the vehicle to drift without driver steering input. The driver must exert effort to counteract this drift. The driver steering effort may be reduced by predicting and sensing this banking or cross-wind and automatically applying an appropriate counter-torque to the power steering system. If the banking or cross-wind in present in conjunction with a geospatially-determined turn, for example, the predictive algorithm can reduce the overlayed steering torque entering the curve so as to not interfere with or alter the driver's normal steering input.

Although the present disclosure is illustrated and described herein with reference to preferred embodiments and specific examples thereof, it will be readily apparent to persons of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A method, comprising:
   obtaining predicted driving condition data from a database, wherein the database comprises one or more of geospatial data and remote vehicle data, wherein the one or more of the geospatial data and the remote vehicle data comprise at least predicted road orientation and topography, road banking, and cross-wind data for a geographical area;
   obtaining real-time vehicle state data from equipment communicatively connected to a vehicle, wherein the real-time vehicle state data comprises at least vehicle speed, attitude, and side-force data;
   weighting the predicted driving condition data and the real-time vehicle state data based on a confidence associated with each;
   combining the weighted predicted driving condition data and the real-time vehicle state data to formulate a desired steering torque request necessary to compensate for predicted and actual driving conditions experienced by the vehicle potentially causing or causing undesirable side-force on the vehicle; and
   providing the desired steering torque request to a power steering assist system of the vehicle to compensate for the predicted and actual driving conditions experienced by the vehicle thereby counteracting the undesirable side-force on the vehicle before or as the undesirable side-force on the vehicle occurs.

2. The method of claim 1, further comprising weighting the predicted driving condition data and the real-time vehicle state data based on the confidence associated with each prior to combining the weighted predicted driving condition data and the real-time vehicle state data.

3. The method of claim 1, wherein the geospatial data is stored locally in the vehicle or remotely in a server and comprises current or historical geospatial road condition data obtained from any source.

4. The method of claim 1, wherein the geospatial data is stored locally in the vehicle or remotely in a server and comprises historical geospatial road condition data obtained by the vehicle.

5. The method of claim 1, wherein the geospatial data is stored remotely in a server and comprises current or predicted weather data.

6. The method of claim 1, wherein the remote vehicle data comprises one or more of current or historical geospatial road condition data and weather data.

7. The method of claim 1, further comprising validating the predicted driving condition data using the real-time vehicle state data.

8. The method of claim 1, further comprising communicating the real-time vehicle state data to a remote server for use by other vehicles as other predicted driving condition data.

9. A non-transitory computer-readable medium stored in a memory and executed by a processor to execute the steps comprising:
  obtaining predicted driving condition data from a database, wherein the database comprises one or more of geospatial data and remote vehicle data, wherein the one or more of the geospatial data and the remote vehicle data comprise at least predicted road orientation and topography, road banking, and cross-wind data for a geographical area;
  obtaining real-time vehicle state data from equipment communicatively connected to a vehicle, wherein the real-time vehicle state data comprises at least vehicle speed, attitude, and side-force data;
  weighting the predicted driving condition data and the real-time vehicle state data based on a confidence associated with each;
  combining the weighted predicted driving condition data and the real-time vehicle state data to formulate a desired steering torque request necessary to compensate for predicted and actual driving conditions experienced by the vehicle potentially causing or causing undesirable side-force on the vehicle; and
  providing the desired steering torque request to a power steering assist system of the vehicle to compensate for the predicted and actual driving conditions experienced by the vehicle thereby counteracting the undesirable side-force on the vehicle before or as the undesirable side-force on the vehicle occurs.

10. The non-transitory computer-readable medium of claim 9, the steps further comprising weighting the predicted driving condition data and the real-time vehicle state data based on the confidence associated with each prior to combining the weighted predicted driving condition data and the real-time vehicle state data.

11. The non-transitory computer-readable medium of claim 9, wherein the geospatial data is stored locally in the vehicle or remotely in a server and comprises current or historical geospatial road condition data obtained from any source.

12. The non-transitory computer-readable medium of claim 9, wherein the geospatial data is stored locally in the vehicle or remotely in a server and comprises historical geospatial road condition data obtained by the vehicle.

13. The non-transitory computer-readable medium of claim 9, wherein the geospatial data is stored remotely in a server and comprises current or predicted weather data.

14. The non-transitory computer-readable medium of claim 9, wherein the remote vehicle data comprises one or more of current or historical geospatial road condition data and weather data.

15. The non-transitory computer-readable medium of claim 9, the steps further comprising validating the predicted driving condition data using the real-time vehicle state data.

16. The non-transitory computer-readable medium of claim 9, the steps further comprising communicating the real-time vehicle state data to a remote server for use by other vehicles as other predicted driving condition data.

17. A system, comprising:
  a predicted driving condition processing module operable for obtaining predicted driving condition data from a database, wherein the database comprises one or more of geospatial data and remote vehicle data, wherein the one or more of the geospatial data and the remote vehicle data comprise at least predicted road orientation and topography, road banking, and cross-wind data for a geographical area;
  a real-time vehicle state processing module operable for obtaining real-time vehicle state data from equipment communicatively connected to a vehicle, wherein the real-time vehicle state data comprises at least vehicle speed, attitude, and side-force data;
  wherein the predicted driving condition processing module and the real-time vehicle state processing module are operable for weighting the predicted driving condition data and the real-time vehicle state data based on a confidence associated with each;
  a steering torque generator processing module operable for combining the weighted predicted driving condition data and the real-time vehicle state data to formulate a desired steering torque request necessary to compensate for predicted and actual driving conditions experienced by the vehicle potentially causing or causing undesirable side-force on the vehicle; and
  a power steering assist system operable for receiving the desired steering torque request and generating a steering torque overlay to compensate for the predicted and actual driving conditions experienced by the vehicle thereby counteracting the undesirable side-force on the vehicle before or as the undesirable side-force on the vehicle occurs.

18. The system of claim 17, wherein the predicted driving condition processing module and the real-time vehicle state processing module are further operable for weighting the predicted driving condition data and the real-time vehicle state data based on the confidence associated with each prior to combining the weighted predicted driving condition data and the real-time vehicle state data at the steering torque generator processing module.

19. The system of claim 17, further comprising a communications link operable for communicating the real-time vehicle state data to a remote server for use by other vehicles as other predicted driving condition data.

20. The system of claim 17, wherein the predicted driving condition processing module is configured to execute an artificial intelligence algorithm operable for determining, at least in part, the predicted driving condition data.

* * * * *